(12) United States Patent
Jain et al.

(10) Patent No.: US 8,385,302 B2
(45) Date of Patent: Feb. 26, 2013

(54) METHODS AND APPARATUS FOR ENABLING DISTRIBUTED BEACON TRANSMISSIONS

(75) Inventors: Avinash Jain, San Diego, CA (US); Hemanth Sampath, San Diego, CA (US); Mohammad Hossein Taghavi Nasrabadi, San Diego, CA (US); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 12/839,268

(22) Filed: Jul. 19, 2010

(65) Prior Publication Data

US 2011/0170468 A1 Jul. 14, 2011

Related U.S. Application Data

(60) Provisional application No. 61/263,241, filed on Nov. 20, 2009, provisional application No. 61/303,081, filed on Feb. 10, 2010.

(51) Int. Cl.
*H04W 4/00* (2009.01)
(52) U.S. Cl. ........................................................ 370/338
(58) Field of Classification Search ................... None
See application file for complete search history.

(56) References Cited

U.S. PATENT DOCUMENTS

| 2006/0023680 A1* | 2/2006 | Oh et al. | 370/338 |
| 2007/0014269 A1 | 1/2007 | Sherman et al. | |
| 2011/0085536 A1* | 4/2011 | Taoka et al. | 370/338 |
| 2012/0113795 A1* | 5/2012 | Ko et al. | 370/209 |

FOREIGN PATENT DOCUMENTS

WO WO2005066828 A1 7/2005

OTHER PUBLICATIONS

International Search Report and Written Opinion—PCT/US2010/057329, International Search Authority—European Patent Office—Mar. 3, 2011.

* cited by examiner

*Primary Examiner* — Clemence Han
(74) *Attorney, Agent, or Firm* — Dang M. Vo

(57) ABSTRACT

A method to support distributed beacon transmission in a directional communication network is provided. The method may comprise receiving, by a second apparatus, a first reference signal from a first apparatus, wherein the first reference signal comprises network shared information associated with a first network and specific information associated with the first apparatus, generating a second reference signal by updating the network shared information in the first reference signal to include specific information associated with second apparatus, and transmitting the second reference signal at a defined time, wherein the defined time is selected to minimize any interference associated with a subsequent transmission of the first reference signal by the first apparatus.

59 Claims, 8 Drawing Sheets

# METHODS AND APPARATUS FOR ENABLING DISTRIBUTED BEACON TRANSMISSIONS

CROSS-REFERENCE TO RELATED APPLICATIONS

The present application for patent claims priority to Provisional Application No. 61/263,241, entitled "METHODS AND APPARATUS FOR ENABLING DISTRIBUTED BEACON TRANSMISSIONS," filed Nov. 20, 2009, and Provisional Application No. 61/303,081, entitled "METHODS AND APPARATUS FOR ENABLING DISTRIBUTED BEACON TRANSMISSIONS," filed Feb. 10, 2010 the content of which is expressly incorporated by reference herein.

BACKGROUND

1. Field

The present disclosure relates generally to communication systems, and more particularly, to support distributed beacon transmission in a directional communication network.

2. Introduction

In order to address the issue of increasing bandwidth requirements that are demanded for wireless communications systems, different schemes are being developed to allow multiple user terminals to communicate by sharing the channel resources while achieving high data throughputs. Multiple Input or Multiple Output (MIMO) technology represents one such approach that has recently emerged as a popular technique for the next generation communication systems. MIMO technology has been adopted in several emerging wireless communications standards such as the Institute of Electrical Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters). For example, 802.11 ad/ac/a/b/g/n.

Generally, wireless communications systems specified by the IEEE 802.11 standard have a central entity, such as an access point (AP)/point coordination function (PCF) that manages communications between different devices, also called stations (STAs). Having a central entity may simplify design of communication protocols. Further, although any device capable of transmitting a beacon signal may serve as an AP, for an AP to be effective it may have to have a good link quality to all STAs in a network. At high frequencies, where signal attenuation may be relatively severe, communications may be directional in nature and may use beamforming (e.g. beam training) to increase gains. As such, an AP may stratify the following responsibilities to be effective. The AP may have a large sector bound (e.g. a wide steering capability). The AP may have a large beamforming gain (e.g. multiple antennas). The AP may be mounted so that a line of sight path exists to most areas in a network, such as on a ceiling. The AP may use a steady power supply for periodic beacon transmissions and other management functions.

Mobile wireless communications devices (WCD) (e.g. laptops, smartphones, etc.) may have comparatively reduced capabilities to that of a traditional AP due to factors such as cost, power, form factor, etc. For example, antenna steering capability may be limited to a small sector bound, available power may be limited, location may be variable, etc. Even with these limitations, WCDs may be asked to perform as APs to form peer-to-peer networks for various purposes, such as side-loading, file sharing, etc. For example, WCDs may be asked to form peer-to-peer networks where no device may efficiently transmit to and receive from all other devices. Additionally, for example, WCDs may be asked to specify a distributed device discovery protocol that may allow a device to be associated with a peer-to-peer network of interest.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with supporting distributed beacon transmission in a directional communication network. According to one aspect, a method for supporting distributed beacon transmission in a directional communication network is provided. The method can comprise receiving, by a second apparatus, a first reference signal from a first apparatus, wherein the first reference signal comprises network shared information associated with a first network and specific information associated with the first apparatus. Further, the method can comprise generating a second reference signal by updating the network shared information in the first reference signal to include specific information associated with second apparatus. Moreover, the method can comprise transmitting the second reference signal at a defined time, wherein the defined time is selected to minimize any interference associated with a subsequent transmission of the first reference signal by the first apparatus.

Another aspect relates to a computer program product comprising a computer-readable medium. The computer-readable medium comprising code executable to receive, by a second apparatus, a first reference signal from a first apparatus, wherein the first reference signal comprises network shared information associated with a first network and specific information associated with the first apparatus. Further, the computer-readable medium comprises code executable to generate a second reference signal by updating the network shared information in the first reference signal to include specific information associated with second apparatus. More over, the computer-readable medium comprises code executable to transmit the second reference signal at a defined time, wherein the defined time is selected to minimize any interference associated with a subsequent transmission of the first reference signal by the first apparatus.

Yet another aspect relates to an apparatus. The apparatus can comprise means for receiving a first reference signal from a first apparatus, wherein the first reference signal comprises network shared information associated with a first network and specific information associated with the first apparatus. Further, the apparatus can comprise means for generating a second reference signal by updating the network shared information in the first reference signal to include specific information associated with the apparatus. Moreover, the apparatus can comprise means for transmitting the second reference signal at a defined time, wherein the defined time is selected to minimize any interference associated with a subsequent transmission of the first reference signal by the first apparatus.

Another aspect relates to a station. The station can include an antenna. Further, the station can include a processing system coupled to the antenna, configured to: receive a first reference signal from a first apparatus, wherein the first reference signal comprises network shared information associated with a first network and specific information associated with the first apparatus, generate a second reference signal by updating the network shared information in the first reference signal to include specific information associated with the station, and transmit the second reference signal at a defined time, wherein the defined time is selected to minimize any interference associated with a subsequent transmission of the first reference signal by the first apparatus.

Another aspect relates to an apparatus. The apparatus can include a processing system configured to: receive a first reference signal from a first apparatus, wherein the first reference signal comprises network shared information associated with a first network and specific information associated with the first apparatus, generate a second reference signal by updating the network shared information in the first reference signal to include specific information associated with the apparatus, and transmit the second reference signal at a defined time, wherein the defined time is selected to minimize any interference associated with a subsequent transmission of the first reference signal by the first apparatus.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

These and other sample aspects of the invention will be described in the detailed description that follow, and in the accompanying drawings, wherein.

Figure 1:
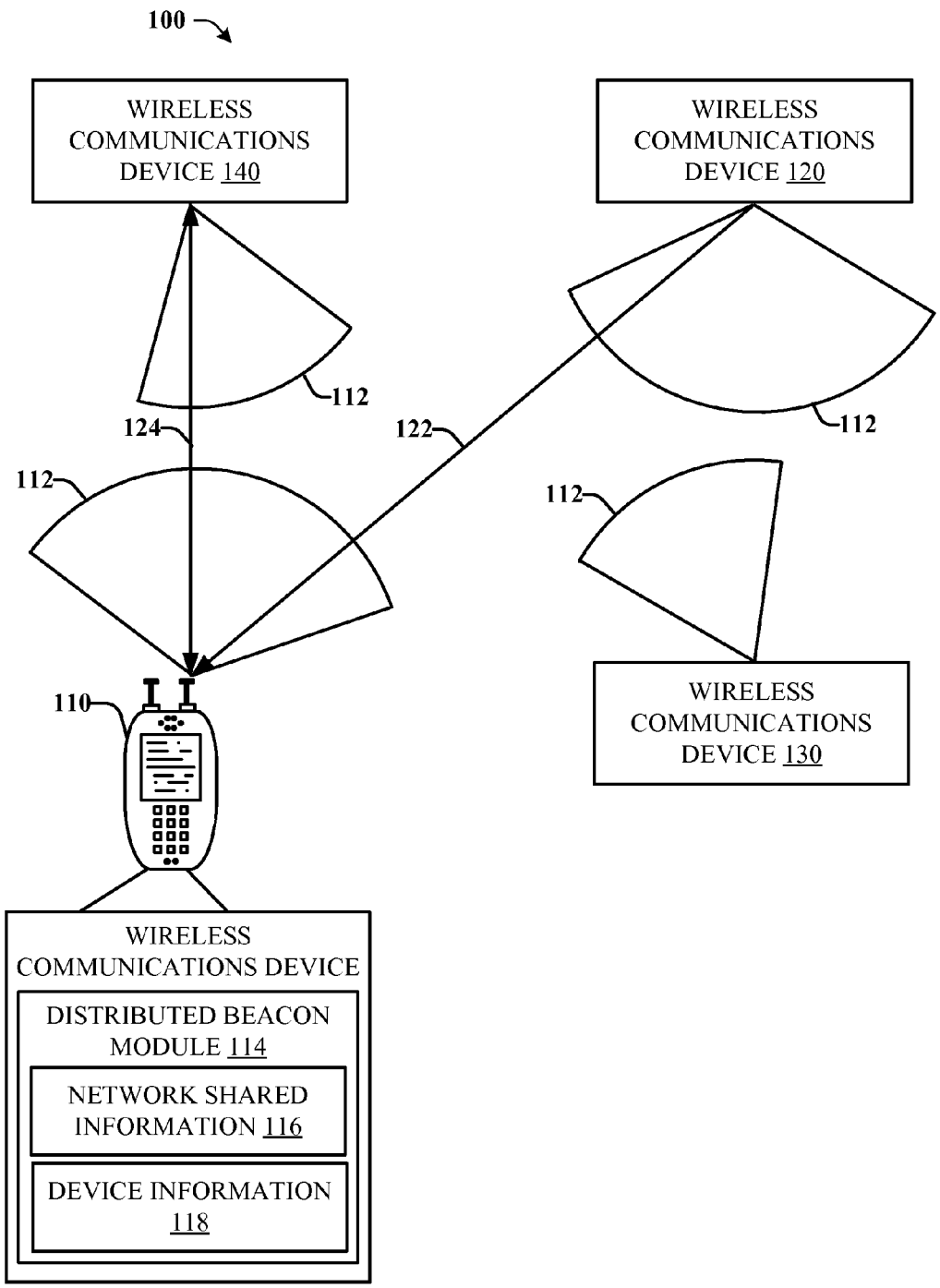
FIG. 1 illustrates a block diagram of a communication network according to an aspect.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of methods and apparatus are described more fully hereinafter with reference to the accompanying drawings. These methods and apparatus may, however, be embodied in many different forms and should not be construed as limited to any specific structure or function presented throughout this disclosure. Rather, these aspects are provided so that this disclosure will be thorough and complete, and will fully convey the scope of these methods and apparatus to those skilled in the art. Based on the descriptions herein teachings herein one skilled in the art should appreciate that that the scope of the disclosure is intended to cover any aspect of the methods and apparatus disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure herein may be embodied by one or more elements of a claim.

Several aspects of a wireless network will now be presented with reference to FIG. 1. The wireless communication system 100 is shown with several wireless nodes, generally designated as nodes 110, 120, 130 and 140, wherein the several nodes 110, 120, 130 and 140 may communicate using a directionally based protocol which allows communicates within a defined coverage region 112. As used herein, a wireless node 110, 120, 130 and 140 may be referred to as a wireless communications device (WCD), user equipment (UE), a laptop, etc. Each wireless node is capable of receiving and/or transmitting. In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal By way of example, an access point may be referred to as a base station, a base transceiver station, a station, a terminal, a node, an access terminal acting as an access point, a WLAN device, or some other suitable terminology. An access terminal may be referred to as a user terminal, a mobile station, a subscriber station, a station, a wireless device, a terminal, a node, or some other suitable terminology. The various concepts described throughout this disclosure are intended to apply to all suitable wireless nodes regardless of their specific nomenclature.

The wireless communication system 100 may support access terminals distributed throughout a geographic region. Connectivity assistance system 120 may be used to provide coordination and control of the access terminals, as well as access to other networks (e.g., Internet). An access terminal, which may be fixed or mobile, may use backhaul services of an access point or engage in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless node.

Generally, as depicted in FIG. 1, multiple wireless nodes 110, 120, 130 and 140 may be distributed throughout a geographic region in such a manner than no one wireless node may communication with all other nodes. For example, WCD 140 may communicate with WCD 110 and WCD 130 but not WCD 120. Further, each wireless node may have a different coverage region 112 over which it may communicate. For example, WCD 140 may have small coverage region than WCD 110.

In operation, a peer-to-peer network may be established between multiple wireless nodes. In one aspect, a first WCD 120 may turn on. In such an aspect, WCD 120 may search for any beacon transmissions. In one such aspect, a search may be performed by WCD 120 applying a broad coverage focus over a coverage region defined by multidirectional/quasi-omni directional antenna associated with WCD 120. In another such aspect, a search may be performed by WCD 120 sweeping a coverage region in a lighthouse fashion defined by multidirectional/quasi-omni directional antenna associated with WCD 120. In one aspect, the search may be performed for a time defined search duration, etc. After the defined search duration has finished, WCD 120 may transmit a reference signal, such as a beacon signal, probe request, a probe response, etc. In one aspect, the reference signal, such as a probe request, may be transmitted omni-directionally. Such beacon transmissions may be performed periodically. In one aspect, the period between successive transmissions may be referred to as a superframe. In one aspect, the reference signal may include information as such, but not limited to, timestamp information to set a common clock, a peer-to-peer network identifier, a device identifier, capability information, a superframe duration, transmission direction information, reception direction information, a neighbor list, an extended neighbor list, a contention access period, a service period, a beam training period, etc. In one aspect, the neighbor list may initially be empty. In another aspect, the neighbor list may include information associated with any apparatuses that have established a connection with the beacon transmitting apparatus. In yet another aspect, the neighbor list may include one or more neighbor lists from apparatuses from which the transmitting apparatus has received a reference signal. In one aspect, a contention access period may include a period after a transmission period to allow for other devices to access a transmission. In another aspect, a service period may include a defined period during which a device is intended to receive a transmission. In such an aspect, the service period may be a dedicated service period for a specified device. In yet another aspect, a beam training period may include a defined period during which devices may perform beam training. Further discussion of a search duration, beacon and superframe is provided with reference to FIG. 3.

Furthermore, in operation, WCD 110 may be activated and may seek to establish network communications. In one aspect, distributed beacon module 114 of WCD 110 may support distributed beacon (e.g. reference signal) transmissions in a directional communication network. Further, distributed beacon module 114 of WCD 110 may use an association protocol. In such an aspect, WCD 110 may search for a reference signal transmission. In one such aspect, a search may be performed by WCD 110 applying a broad coverage focus over a coverage region defined by multidirectional/quasi-omni directional antenna associated with WCD 110. In another such aspect, a search may be performed by WCD 110 sweeping a coverage region in a lighthouse fashion defined by multidirectional/quasi-omni directional antenna associated with WCD 110. In the sample operations, upon the detection of the reference from WCD 120, WCD 110 may decode the detected reference signal and may associate 122 with WCD 120. In one aspect, associating 122 may further include authenticating that WCD 120 may communicate with WCD 110. After an association 122 between WCD 110 and 120 is established, information stored in a neighbor list provided with a reference signal may be updated.

Further, WCD 110 and 120 may share reference signal transmission responsibilities (e.g. both WCD 110 and WCD 120 may transmit a reference signal while assuring the reference signal transmission timing avoids collisions). In such an aspect, transmission of a reference signal while avoiding collisions may be performed using a variety of transmission schemes. For example, in a round robin approach, different devices alternatively transmit a reference signal every superframe. Such a scheme may work efficiently for peer-to-peer networks in which few devices are present. In another example, a random backoff scheme may be used where, if no reference signal from another device is detected for multiple superframes, then the device may increase its own reference signal transmission frequency. By contrast, if a reference signal from another device is detected within a few superframes, the device may decrease its own reference signal transmission frequency. In yet another example, an assisted random backoff scheme may be used in which a flag field within a reference signal may be set and/or reset by a device during its own reference signal transmissions. Accordingly, if no reference signal is observed for multiple superframes, a flag may be set to request other devices to increase reference signal transmission frequency. By contrast, if reference signal collisions are occurring, a flag may be reset to request other devices decrease reference signal transmission frequency. In still other example, multiple reference signals may be transmitted during a signal superframe.

In one aspect, a reference signal may include information both common (e.g. shared) information 116 amongst WCDs associated with the network, and device specific information 118. In such an aspect, common (e.g. shared) information 116 may include, timestamp information, reference signal intervals, peer-to-peer network identifiers, channel access protocol information, etc. Further, in such an aspect, device specific information 118 may include a device identifier, a neighbor list, etc.

Returning to the sample operations described above, WCD 140 may be activated. In the depicted aspect, a coverage region 112 associated with WCD 140 does not allow communications with WCD 120, but does communications with WCD 110. Further, following processes discussed above, WCD 140 may associate 124 with WCD 110. As WCD 110 is associated 122 with WCD 120, the newly formed associated 124 may be established so as to avoid collisions at WCD 110. Further, through common information provided by reference signals transmitted by WCD 110, WCD 140 may be made aware of the presence of WCD 120 even though it is not within the coverage region 112 of WCD 140. In one aspect, WCD 140 may transmit a probe request to WCD 110. In such an aspect, WCD 110 may respond with a probe response, wherein the probe response includes common information 116 for the network. Further, in one such aspect, the probe response may also include specific information 118 associated with WCD 120. Further discussion relating to the operations of wireless communications network are provided with reference to FIG. 4.

In one aspect, restrictions may be placed one which WCDs may transmit reference signals and/or may associate new WCDs into the peer-to-peer network. For example, a laptop (e.g. WCD 110) and a printer (e.g. WCD 120) may solely take responsibility for reference signal transmissions. In such an example, additional peripheries (e.g. WCD 130, 140) may not be authorized to admit other WCDs into the network. In another aspect, an infrastructure mode deployment may be used where, for example, a printer indicates in a reference signal that a laptop may not transmit a reference signal and may not allow other devices into the network. As such, the printer may decide to act as an access point and may be solely responsible for associating and/or authenticating additional devices into a network.

In one aspect, multiple frequency channels may be used in a peer-to-peer network. In such an aspect, a peer-to-peer network may limit access based on WCD membership information, capability, network loading, etc. For example, a maximum membership could be provided, and upon reaching this value, devices associated with the network may provide information in transmitted reference signals indicating that the network is full. Further, the reference signal may prompt a device to start a new peer-to-peer network on a different frequency channel, thereby avoiding any interference issues.

In one aspect, multiple peer-to-peer networks may be established with WCDs common to some of the multiple networks. For example, a printer and a laptop may be associated with a first network, while the laptop and a cell phone are associated with a second network. In such a sample aspect, reference signal transmission timing may be set so as to avoid collisions and provide an interference free transmission time for each of the networks. As such, the laptop may share responsibilities for transmitting reference signals for both networks. In one aspect, the laptop may transmit a beacon for each network with which it is associated every superframe, by reserving a portion of the superframe for interaction with the first network and reserving a second portion of the superframe for interactions with the second network. In one such aspect, the reservation timing may be included in the transmitted reference signal. Further, such time reservations may be dynamically allocated. In other words, when a cell phone is not transmitting with the laptop using the second network, then the laptop may use previously reserved time for communications over the first network.

In one aspect, beam time synchronization adjustments may result in delays since each device may synchronize its internal time with timestamp information received in a reference signal and such timing may be affected by propagation time delays. For example, if each device in a network corrects timing by reading a timestamp from a received reference signal, then a transmission from a first to a second device would result in a delayed time value at the second device, and a return signal would result in a further delayed time value for the first device. As time synchronization within a superframe is beneficial for distributed beacon (e.g. reference signal) communications, a maximum tolerable timing error value may be set. To address time drift, each device may perform a timing correction process internally. In such an aspect, if a received reference signal timestamp value is within a maximum time drift threshold, then the device may not internally correct timing based on the received timestamp value. By contrast, if a received reference signal timestamp value is not within a maximum time drift threshold, then the device may internally correct timing based on the received timestamp value. In such an aspect, a maximum timing drift value may be based on maximum propagation delays between devices, for example, assuming a distance of 15 meters then timing difference of 0.1 μs may be considered significant. Further, each device associated with the network may ensure its internal clock does not drift a faction of the maximum timing drift value within a superframe. Therefore, a peer-to-peer network may be synchronized within a maximum timing drift value within performing un-need timing corrections. Further, such timing processes may be used during establishment of coexisting peer-to-peer networks.

The wireless communication system 100 may support MIMO technology. Using MIMO technology, multiple access terminals 120 may communicate simultaneously using Spatial Division Multiple Access (SDMA). SDMA is a multiple access scheme which enables multiple streams transmitted to different receivers at the same time to share the same frequency channel, or communicate using different frequencies, and, as a result, provide higher user capacity. This is achieved by spatially precoding each data stream and then transmitting each spatially precoded stream through a different transmit antenna on the downlink. The spatially precoded data streams arrive at the access terminals with different spatial signatures, which enable each access terminal 110, 130 to recover the data stream destined for that access terminal 110, 130. On the uplink, each access terminal 110, 130 transmits a spatially precoded data stream, which enables the identity of the source of each spatially precoded data stream to be known.

One or more access terminals 110 may be equipped with multiple antennas to enable certain functionality. With this configuration, multiple antennas at the access terminal 110 may be used to communicate to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support MIMO technology, the access terminal 110 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

In the detailed description that follows, various aspects of the disclosure will be described with reference to a MIMO system supporting any suitable wireless technology, such as Orthogonal Frequency Division Multiplexing (OFDM). OFDM is a spread-spectrum technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement with IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this invention are not limited to any particular wireless technology and/or air interface standard.

The wireless node (e.g. 110, 130), whether an access point or access terminal, may be implemented with a protocol that utilizes a layered structure that includes a physical (PHY) layer that implements all the physical and electrical specifications to interface the wireless node to the shared wireless channel, a Medium Access Control (MAC) layer that coordinates access to the shared wireless channel, and an application layer that performs various data processing functions including, by way of example, speech and multimedia codecs and graphics processing. Further discussion of the MAC and PHY layers is provided with reference to FIG. 3. Additional protocol layers (e.g., network layer, transport layer) may be required for any particular application. In some configurations, the wireless node may act as a relay point between an access point and access terminal, or two access terminals, and therefore, may not require an application layer. Those skilled in the art will be readily able to implement the appropriate protocol for any wireless node depending on the particular application and the overall design constraints imposed on the overall system.

Figure 2:
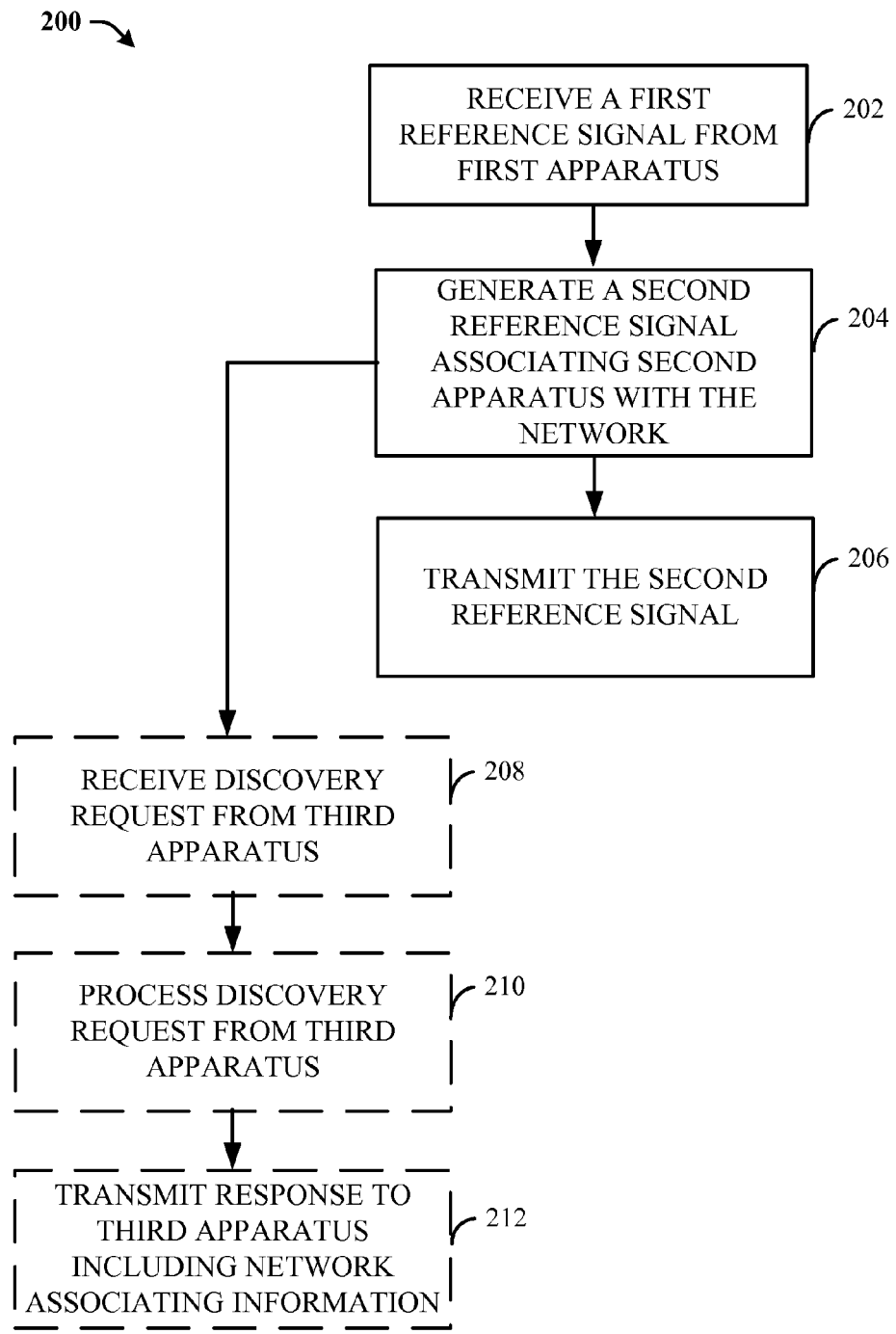
FIG. 2 is a flowchart of an aspect of a communication network which supports distributed beacon transmissions in a directional communication network.

FIG. 2 illustrates various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring to FIG. 2, a methodology 200 in which a wireless node may support distributed beacon (e.g. reference signal) transmissions in a directional communication network is illustrated. At reference numeral 202, a first reference signal may be received from a second apparatus (e.g. a WCD, a wireless node, etc.). In one aspect, a reference signal may include a probe request from the second apparatus. In another aspect, the reference signal may include a beacon. Such beacon transmissions may be performed periodically. In one aspect, the period between successive transmissions may be refers to as a superframe. In one aspect, the reference signal may include information as such, but not limited to, timestamp information to set a common clock, a peer-to-peer network identifier, a device identifier, capability information, a superframe duration, transmission direction information, reception direction information, a neighbor list, an extended neighbor list, etc. In one aspect, the neighbor list may initially be empty. In another aspect, the neighbor list may include information associated with any apparatuses that have established a connection with the beacon transmitting apparatus. In yet another aspect, the neighbor list may include one or more neighbor lists from apparatuses from which the transmitting apparatus has received a reference signal such as at least one of the first or second reference signal. In one aspect, a contention access period may include a period after a transmission period to allow for other devices to access a transmission. In another aspect, a service period may include a defined period during which a device is intended to receive a transmission. In such an aspect, the service period may be a dedicated service period for a specified device. In yet another aspect, a beam training period may include a defined period during which devices may perform beam training.

At reference numeral 204, a second reference signal may be generated. In one aspect, the second reference signal may include network shared information received from the first reference signal with applicable values updated in include reference to the second apparatus. For example, a neighbor list may be updated. Further, in such an aspect, the second reference signal may include device specific information associated with the second device. At reference numeral 206, the second reference signal may be transmitted. Thus, both the first and second apparatus may share reference signal transmission responsibilities (e.g. both may transmit a reference signal while assuring the reference signal transmission timing avoids collisions). In one aspect, the second reference signal may be transmitted during a defined time which may be selected to reduce and/or minimize any interference associated with a subsequent transmission of the first reference signal by the first apparatus. In one aspect, this defined time may include a period within a contention access period, a service period, etc. In one such aspect, the service period may be a dedicated service period between defined devices. In another aspect, the second reference signal may be transmitted less frequently than the first reference signal is transmitted.

Optionally, at reference numeral 208, after the first two devices are associated through an established peer-to-peer network, a discovery request may be received from a third apparatus. In one aspect, the discovery request may be received in response to the third apparatus receiving the second reference signal. In another aspect, the discovery request may be transmitted by the third apparatus with no knowledge of an established network. Further, optionally, at reference numeral 210, the received discovery request may be processed to determine whether the third apparatus may be authorized to access the established network. In one aspect associated with the optional process, at reference numeral 212, a response may be transmitted to the third apparatus including network associating information. In such an aspect, the second reference signal may be further updated to include reference to the third apparatus in the neighbor list or the like.

Figure 3A:
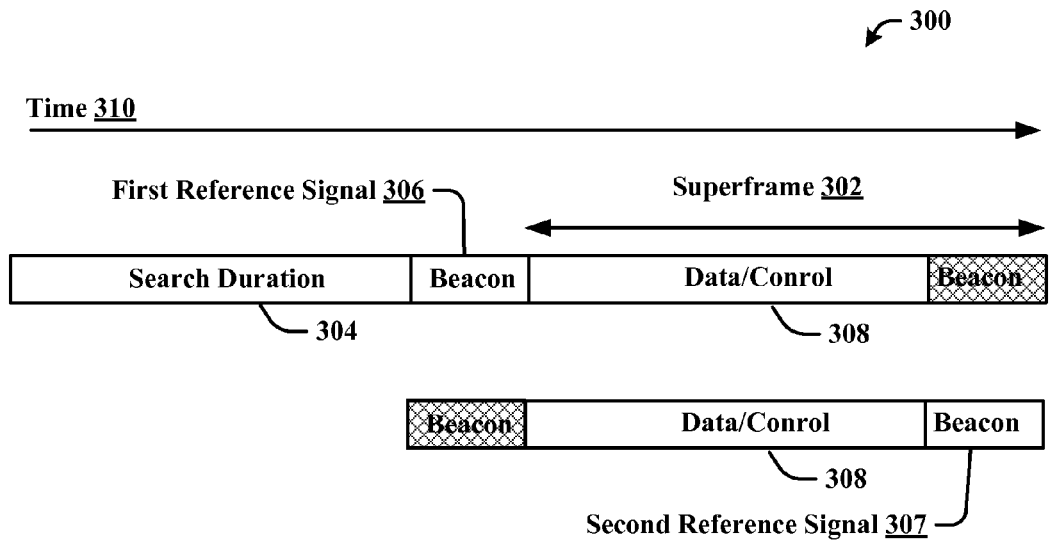
FIG. 3A illustrates a block diagram with multiple time slot reservations within a superframe according to an aspect.

With reference to FIG. 3A, a sample timing block diagram 300 with multiple time slot reservations within a superframe is depicted as time 310 passes. The timing block diagram includes a searching duration 304. In one aspect, the searching duration may be defined as a time, after activation of an apparatus and prior to the apparatus transmitting a reference signal, during which the apparatus may search for other apparatus with which to communicate. Additionally, the period between successive reference signal (e.g. beacon 306) transmissions may be refers to as a superframe 302. As such, a superframe may include a time interval for a first reference signal 306, a time interval for data/control communications 308, and a second reference signal 307. As depicted in FIG. 3A superframes for two apparatus are synchronized such that the reference signal 306 transmission by the first apparatus does not interfere with the reference signal transmission 307 from the second apparatus.

Figure 3B:
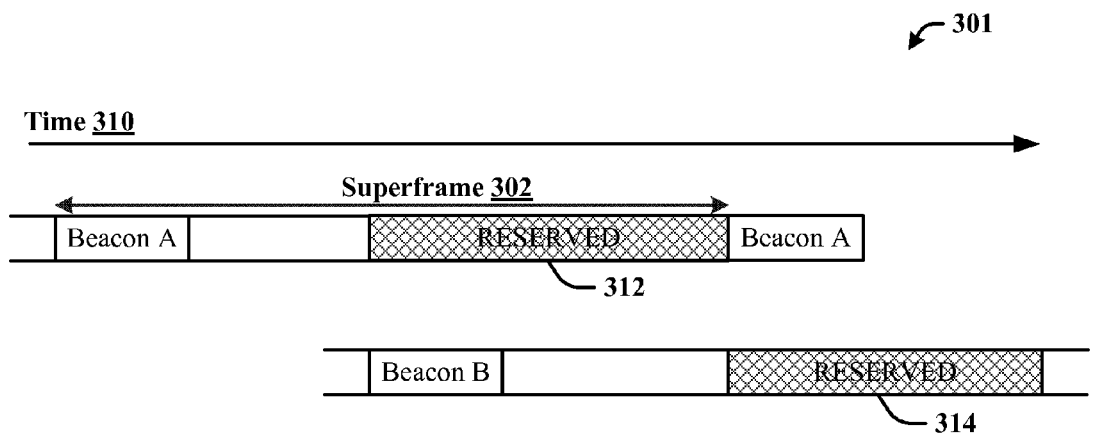
FIG. 3B illustrates block diagram with multiple superframes associating an apparatus with multiple networks through reserved time slots according to an aspect.

With reference to FIG. 3B, a sample timing block diagram 301 multiple superframes associating an apparatus with multiple networks through reserved time slots is depicted as time 310 passes. In one aspect, where an apparatus is associated with multiple networks, a superframe 302 may be distributed between the multiple networks using reservations 312, 314. For example, an apparatus may transmit a beacon for each network, with which it is associated, or may transmit a beacon for only second network based on the information contained in the reference signal received for the first network. This second reference signal transmitted may contain the same superframe duration as used by the first network and may be obtained using the first reference signal. The second reference signal may reserve a portion of the superframe that is used by the first network 312 and as such may forbid apparatuses in the second network to use this reserved duration. Likewise, the first reference signal may reserve a portion of the superframe that is used by the second network 314. Further, such time reservations may be dynamically allocated. In other words, for example, when a cell phone is not transmitting with the laptop using the second network, then the laptop may use previously reserved time for communications over the first network.

Figure 4:
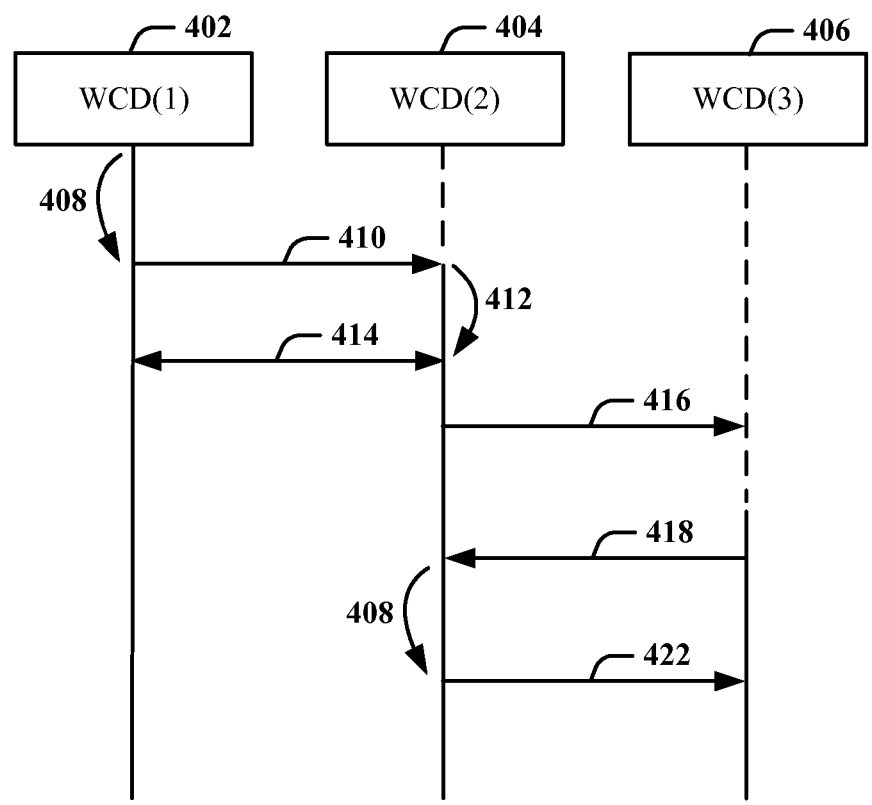
FIG. 4 illustrates a call flow diagram of a communication network which supports distributed beacon transmissions in a directional communication network.

FIG. 4 illustrates various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 4, a sample call flow 400 for supporting distributed beacon transmission in a directional communication network is illustrated. Generally, the communication network may include multiple apparatus (e.g. WCD(1) 402, WCD(2) 404 and WCD(3) 406). Further, as depicted in FIG. 4, an inactive WCD is indicated through use of a dashed line.

Returning to FIG. 4, at sequence step 408, WCD (1) 402 may be activated and may search for any reference signal transmissions. In one such aspect, a search may be performed by WCD (1) 402 applying a broad coverage focus over a coverage region defined by multidirectional/quasi-omni directional antenna associated with WCD (1) 402. In another such aspect, a search may be performed by WCD (1) 402 sweeping a coverage region in a lighthouse fashion defined by multidirectional/quasi-omni directional antenna associated with WCD (1) 402. In one aspect, the search may be performed for a time defined as a search time interval. After the defined searching time interval has elapsed, at sequence step 410, WCD (1) 402 may transmit a reference signal, such as a beacon signal, probe request, etc. Such beacon transmissions may be performed periodically. In one aspect, the period between successive transmissions may be refers to as a superframe. In one aspect, the reference signal may include information as such, but not limited to, timestamp information to set a common clock, a peer-to-peer network identifier, a device identifier, capability information, a superframe duration, transmission direction information, reception direction information, a neighbor list, an extended neighbor list, etc. In one aspect, the neighbor list may initially be empty. In another aspect, the neighbor list may include information associated with any apparatuses that have established a connection with the beacon transmitting apparatus. In yet another aspect, the neighbor list may include one or more neighbor lists from apparatuses from which the transmitting apparatus has received a reference signal such as at least one of the first or second reference signal. In one aspect, a contention access period may include a period after a transmission period to allow for other devices to access a transmission. In another aspect, a service period may include a defined period during which a device is intended to receive a transmission. In such an aspect, the service period may be a dedicated service period for a specified device. In yet another aspect, a beam training period may include a defined period during which devices may perform beam training.

At reference numeral 412, WCD (2) 404 may be activated and may search for may search for any reference signal transmissions. In the depicted aspect, WCD(2) 404 may receive the reference signal transmitted by WCD(1) 402. At sequence step 414, WCD(1) 402 and WCD(2) 404 may associate to form a peer-to-peer network. In one aspect, the associating may further include authenticating WCD (2) 404 may communicate with WCD (1) 402. After an association between WCD(1) 402 and WCD(2) 404 is established, information stored in a neighbor list provided with a reference signal may be updated.

Further, WCD(1) 402 and WCD(2) 404 may share reference signal transmission responsibilities (e.g. both WCD(1) 402 and WCD(2) 404 may transmit a reference signal while assuring the reference signal transmission timing avoids collisions). At sequence step 416, WCD(2) 404 may transmit a reference signal include information associating WCD(2) 404 to WCD(1) 402. As depicted in FIG. 4, WCD(3) 406 may not be active when WCD(2) 404 initially transmits the second reference signal. At sequence step 418, discovery request may be transmitted from WCD(3) 406. In one aspect, the discovery request may be transmitted in response to WCD(3) 406 receiving the second reference signal. In another aspect, the discovery request may be transmitted by WCD(3) 406 with no knowledge of an established network. Further, at sequence step 420, the received discovery request may be processed to determine whether the third apparatus may be authorized to access the established. At sequence step 422, a response may be transmitted to WCD(3) 406 which may include network associating information. In such an aspect, the second reference signal may be further updated to include reference to WCD(3) 406 in the neighbor list or the like.

Figure 5:
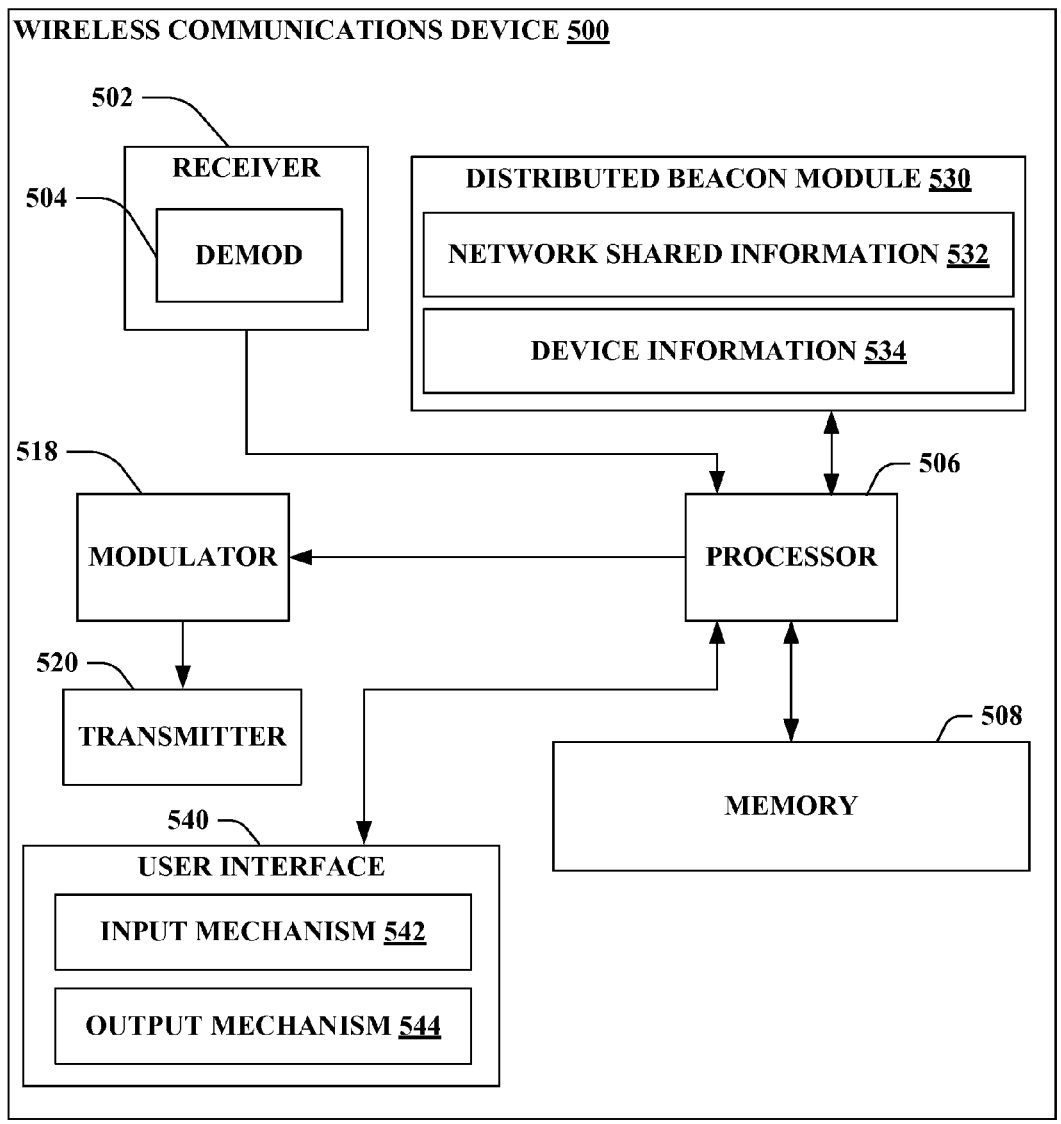
FIG. 5 illustrates a block diagram example architecture of a wireless communications device.

While still referencing FIG. 1, but turning also now to FIG. 5, a sample architecture of wireless communications device 110 is illustrated. As depicted in FIG. 5, wireless communications device 500 comprises receiver 502 that receives a signal from, for instance, a receive antenna (not shown), performs typical actions on (e.g., filters, amplifies, downconverts, etc.) the received signal, and digitizes the conditioned signal to obtain samples. Receiver 502 can comprise a demodulator 504 that can demodulate received symbols and provide them to processor 506 for channel estimation. Further, receiver 502 may receive signals from multiple networks using multiple communication protocols. In one aspect, receiver 502 may receive a signal from a network using at least one of: CDMA, WCDMA, TDMA, TD-SCDMA, UMTS, IP, GSM, LTE, WiMax, UMB, EV-DO, 802.11, BLUETOOTH, etc.

Processor 506 can be a processor dedicated to analyzing information received by receiver 502 and/or generating information for transmission by transmitter 520, a processor that controls one or more components of wireless communications device 500, and/or a processor that both analyzes information received by receiver 502, generates information for transmission by transmitter 520, and controls one or more components of wireless communications device 500.

Wireless communications device 500 can additionally comprise memory 508 that is operatively coupled to, and/or located in, processor 506 and that can store data to be transmitted, received data, information related to available channels, data associated with analyzed signal and/or interference strength, information related to an assigned channel, power, rate, or the like, and any other suitable information for estimating a channel and communicating via the channel. Memory 508 can additionally store protocols and/or algorithms associated with estimating and/or utilizing a channel (e.g., performance based, capacity based, etc.).

It will be appreciated that data store (e.g., memory 508) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 508 of the subject systems and methods may comprise, without being limited to, these and any other suitable types of memory.

Wireless communications device 500 can further include distributed beacon module 530 to support distributed beacon (e.g. reference signal) transmissions in a directional communication network. Distributed beacon module 530 may include network shared information 532 and device specification information 534. In one an aspect, common (e.g. shared) information 532 may include, timestamp information, reference signal intervals, peer-to-peer network identifiers, channel access protocol information, etc. Further, in another aspect, device specific information 534 may include a device identifier, a neighbor list, etc.

Additionally, wireless communications device 500 may include user interface 540. User interface 540 may include input mechanisms 542 for generating inputs into communications device 500, and output mechanism 542 for generating information for consumption by the user of the communications device 500. For example, input mechanism 542 may include a mechanism such as a key or keyboard, a mouse, a touch-screen display, a microphone, etc. Further, for example, output mechanism 544 may include a display, an audio speaker, a haptic feedback mechanism, a Personal Area Network (PAN) transceiver etc. In the illustrated aspects, the output mechanism 544 may include a display operable to present media content that is in image or video format or an audio speaker to present media content that is in an audio format.

Figure 6:
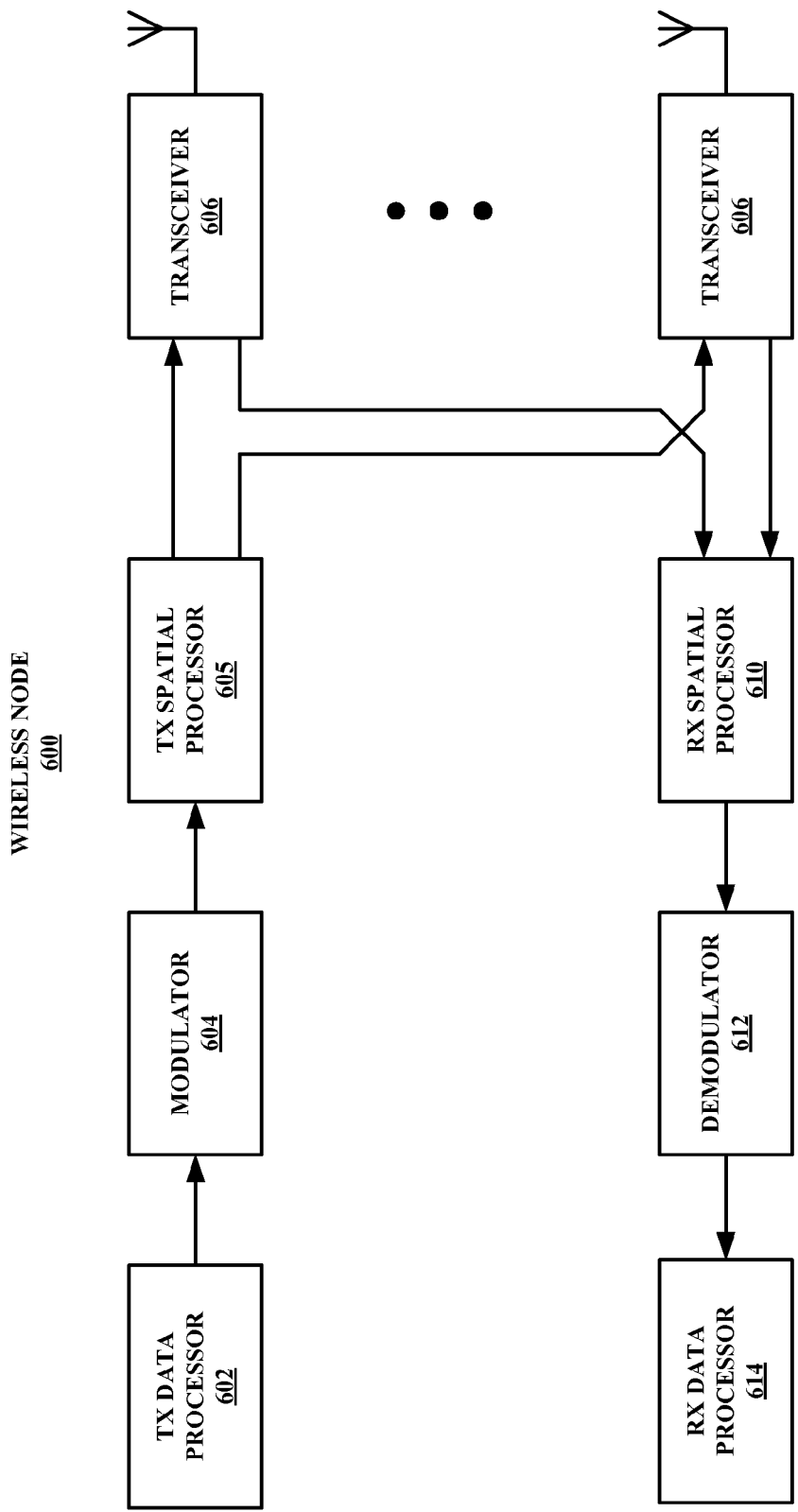
FIG. 6 illustrates another block diagram example architecture of a wireless node.

FIG. 6 is a conceptual block diagram illustrating an example of the signal processing functions of the PHY layer. In a transmit mode, a TX data processor 602 may be used to receive data from the MAC layer and encode (e.g., Turbo code) the data to facilitate forward error correction (FEC) at the receiving node. The encoding process results in a sequence of code symbols that that may be blocked together and mapped to a signal constellation by the TX data processor 602 to produce a sequence of modulation symbols.

In wireless nodes, the modulation symbols from the TX data processor 602 may be provided to a modulator 604. The modulator splits the modulation symbols into streams. Each stream is then mapped to an subcarrier and then combined together using an Inverse Fast Fourier Transform (IFFT) to produce a time domain stream.

A TX spatial processor 606 performs spatial processing on the OFDM stream. This may be accomplished by spatially precoding each OFDM and then providing each spatially precoded stream to a different antenna 608 via a transceiver 606. Each transmitter 606 modulates an RF carrier with a respective precoded stream for transmission over the wireless channel.

In a receive mode, each transceiver 606 receives a signal through its respective antenna 608. Each transceiver 606 may be used to recover the information modulated onto an RF carrier and provide the information to a RX spatial processor 610.

The RX spatial processor 610 performs spatial processing on the information to recover any spatial streams destined for the wireless node 600. The spatial processing may be performed in accordance with Channel Correlation Matrix Inversion (CCMI), Minimum Mean Square Error (MMSE), Soft Interference Cancellation (SIC), or some other suitable technique. If multiple spatial streams are destined for the wireless node 600, they may be combined by the RX spatial processor 610.

In wireless nodes, the stream (or combined stream) from the RX spatial processor 610 is provided to a demodulator 612. The OFDM demodulator 612 converts the stream (or combined stream) from time-domain to the frequency domain using a Fast Fourier Transform (FFT). The frequency domain signal comprises a separate stream for each subcarrier of the signal. The demodulator 612 recovers the data (i.e., modulation symbols) carried on each subcarrier and multiplexes the data into a stream of modulation symbols.

A RX data processor 614 may be used to translate the modulation symbols back to the correct point in the signal constellation. Because of noise and other disturbances in the wireless channel, the modulation symbols may not correspond to an exact location of a point in the original signal constellation. The RX data processor 614 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 614 then uses the sequence of code symbol LLRs in order to decode the data that was originally transmitted before providing the data to the MAC layer.

Figure 7:
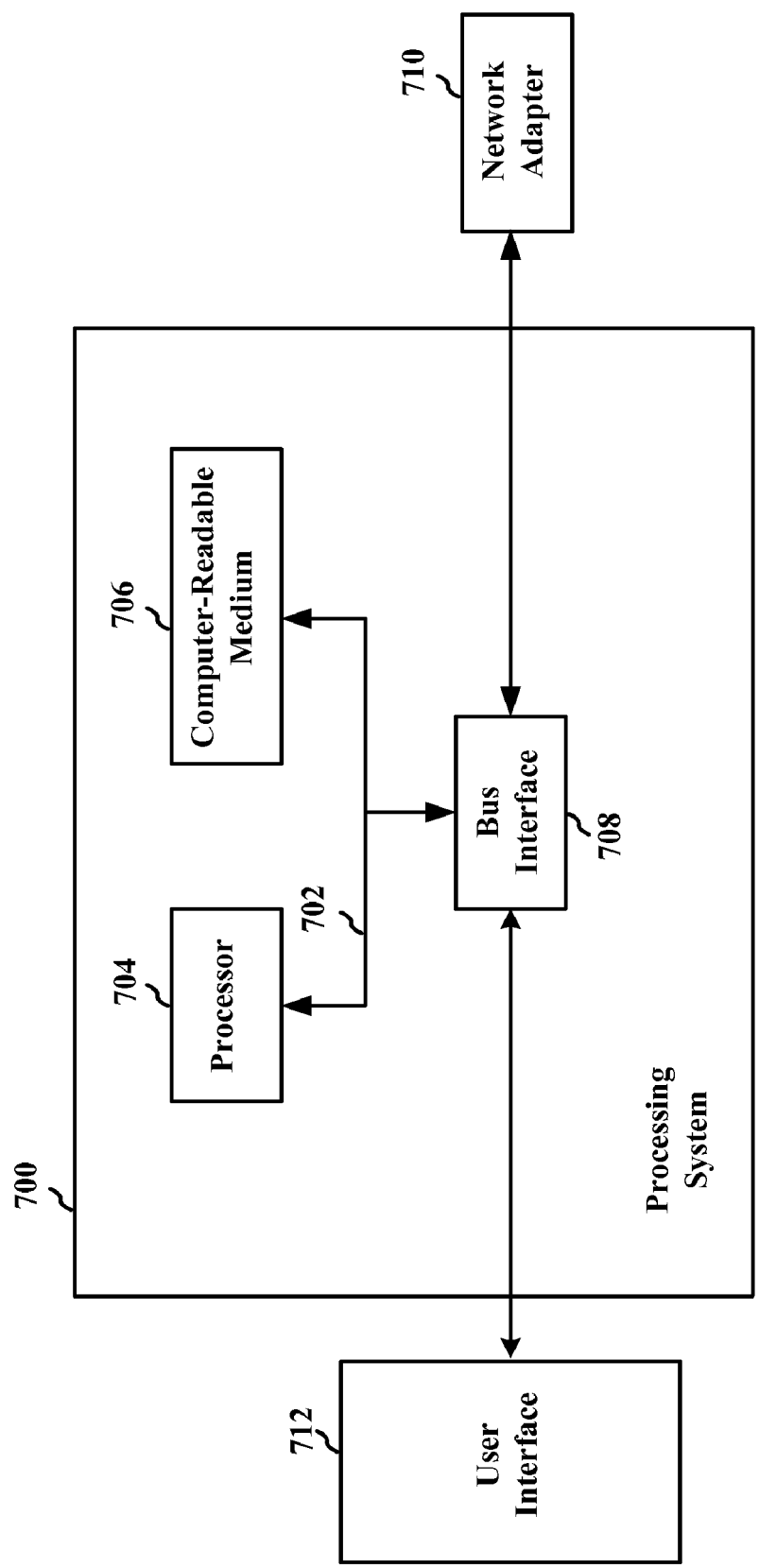
FIG. 7 illustrates a conceptual diagram illustrating an example of a hardware configuration for a processing system in a wireless node.

FIG. 7 is a conceptual diagram illustrating an example of a hardware configuration for a processing system in a wireless node. In this example, the processing system 700 may be implemented with a bus architecture represented generally by bus 702. The bus 702 may include any number of interconnecting buses and bridges depending on the specific application of the processing system 700 and the overall design constraints. The bus links together various circuits including a processor 704, computer-readable media 706, and a bus interface 708. The bus interface 708 may be used to connect a network adapter 710, among other things, to the processing system 700 via the bus 702. The network interface 710 may be used to implement the signal processing functions of the PHY layer. In the case of an access terminal 110 (see FIG. 1), a user interface 712 (e.g., keypad, display, mouse, joystick, etc.) may also be connected to the bus via the bus interface 708. The bus 702 may also link various other circuits such as timing sources, peripherals, voltage regulators, power management circuits, and the like, which are well known in the art, and therefore, will not be described any further.

The processor 704 is responsible for managing the bus and general processing, including the execution of software stored on the computer-readable media 708. The processor 708 may be implemented with one or more general-purpose and/or special-purpose processors. Examples include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, or any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials.

In the hardware implementation illustrated in FIG. 7, the computer-readable media 706 is shown as part of the processing system 700 separate from the processor 704. However, as those skilled in the art will readily appreciate, the computer-readable media 706, or any portion thereof, may be external to the processing system 700. By way of example, the computer-readable media 706 may include a transmission line, a carrier wave modulated by data, and/or a computer product separate from the wireless node, all which may be accessed by the processor 704 through the bus interface 708. Alternatively, or in addition to, the computer readable media 704, or any portion thereof, may be integrated into the processor 704, such as the case may be with cache and/or general register files.

The processing system, or any part of the processing system, may provide the means for performing the functions recited herein. By way of example, the processing system executing code may provide the means for receiving, by a second apparatus, a first reference signal from a first apparatus, wherein the first reference signal comprises network shared information associated with a first network and specific information associated with the first apparatus, generating a second reference signal by updating the network shared information in the first reference signal to include specific information associated with second apparatus, and means for transmitting the second reference signal at a defined time, wherein the defined time is selected to minimize any interference associated with the reception of the first reference signal. Alternatively, the code on the computer-readable medium may provide the means for performing the functions recited herein.

Figure 8:
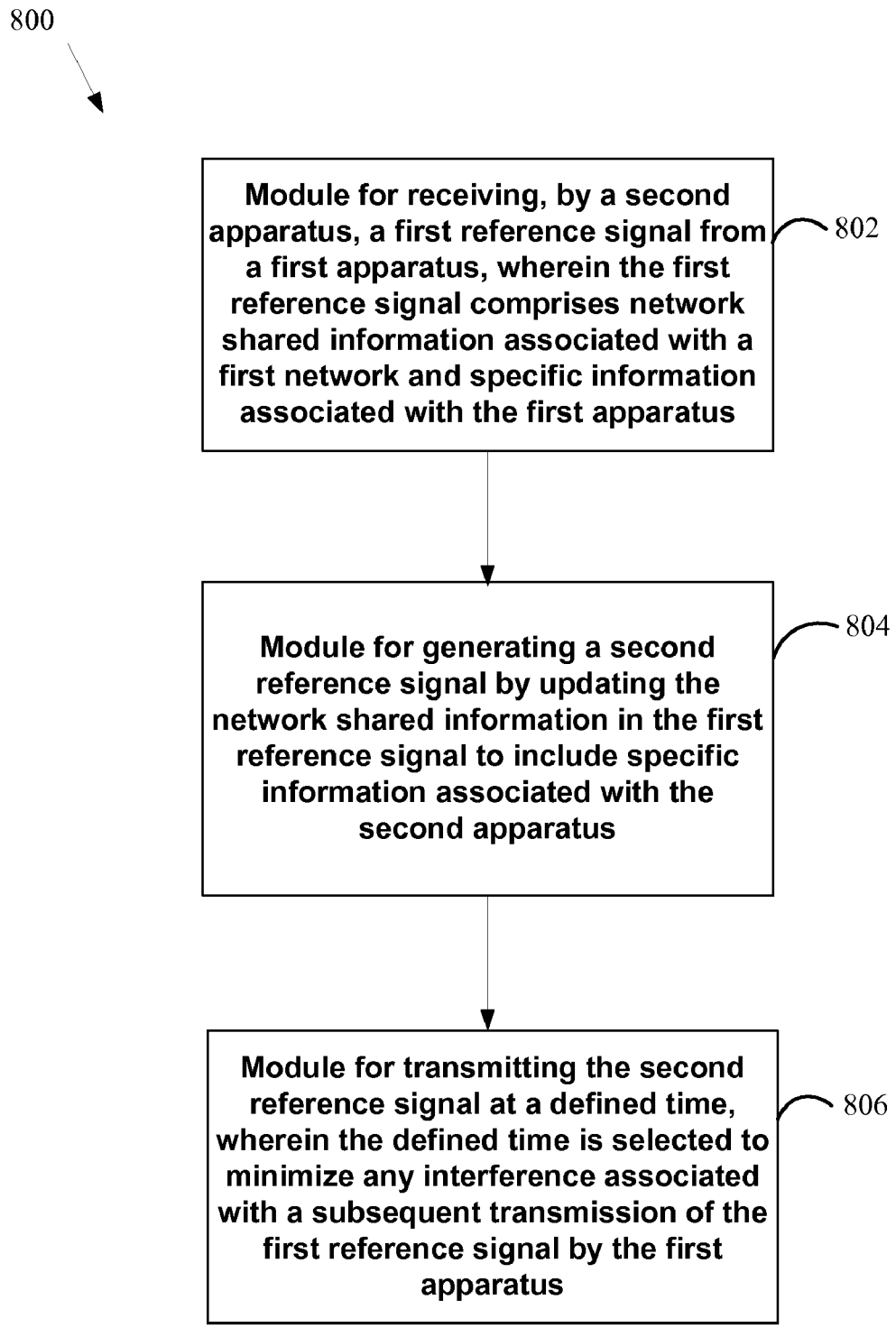
FIG. 8. is a conceptual block diagram illustrating the functionality of a sample apparatus.

FIG. 8 is a conceptual block diagram 800 illustrating the functionality of a sample apparatus 700. The apparatus 700 includes a module 802 that receives a first reference signal from a first apparatus, wherein the first reference signal comprises network shared information associated with a first network and specific information associated with the first apparatus, a module 804 that generates a second reference signal by updating the network shared information in the first reference signal to include specific information associated with the apparatus, and a module 806 that transmits the second reference signal at a defined time, wherein the defined time is selected to minimize any interference associated with a subsequent transmission of the first reference signal by the first apparatus.

Referring to FIG. 1 and FIG. 7, in one configuration, the apparatus 600 for wireless communication includes means for receiving a first reference signal from a first apparatus, wherein the first reference signal comprises network shared information associated with a first network and specific information associated with the first apparatus, generating a second reference signal by updating the network shared information in the first reference signal to include specific information associated with the apparatus, and means for transmitting the second reference signal at a defined time, wherein the defined time is selected to minimize any interference associated with a subsequent transmission of the first reference signal by the first apparatus. In one aspect, the means for receiving comprise a receiver 502. In another aspect, the means for generating comprise a distributed beacon module 530. In still another aspect, the means for transmitting comprise a transmitter 520. In another configuration, the apparatus 600 for wireless communication includes means for transmitting the second reference signal less frequently than transmission of the first reference signal by the first apparatus. In another configuration, the apparatus 600 for wireless communication includes means for broadcasting the second reference signal in all directions in which one or more antennas associated with the second apparatus can transmit. In another configuration, the apparatus 600 for wireless communication includes means for receiving, by the second apparatus, discovery request from a third apparatus, means for processing the discovery request to determine eligibility of the third apparatus to access the first network, and means for transmitting a response to the third apparatus, wherein the response comprises the network shared information associated with the first network and specific information associated with the first apparatus. In another configuration, the apparatus 600 for wireless communication includes means for transmitting, by the second apparatus, a third reference signal that comprises information associated with a second network, while maintaining an association with the first network, wherein the information associated with the second network comprises time synchronization information and network shared information from the first reference signal. In such a configuration the first reference signal may include time synchronization information associated with the first network. In another configuration, the apparatus 600 for wireless communication includes means for receiving the first reference signal using an IEEE 802.11 protocol. The aforementioned means is the processing system 700 configured to perform the functions recited by the aforementioned means. As described supra, the processing system 700 includes the TX Processor 602, the RX Processor 614, and processors 605 and 610. As such, in one configuration, the aforementioned means may be the TX Processor 602, the RX Processor 614, and processors 605 and 610 configured to perform the functions recited by the aforementioned means.

Those skilled in the art will recognize how best to implement the described functionality presented throughout this disclosure depending on the particular application and the overall design constraints imposed on the overall system.

It is understood that any specific order or hierarchy of steps described in the context of a software module is being presented to provide an examples of a wireless node. Based upon design preferences, it is understood that the specific order or hierarchy of steps may be rearranged while remaining within the scope of the invention.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

In one or more sample aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

What is claimed is:

1. A method for wireless communications, comprising:
   receiving, by a second apparatus, a first reference signal from a first apparatus, wherein the first reference signal comprises network shared information associated with a first network and specific information associated with the first apparatus;
   generating a second reference signal by updating the network shared information in the first reference signal to include specific information associated with the second apparatus; and
   transmitting the second reference signal at a defined time, wherein the defined time is selected to minimize any interference associated with a subsequent transmission of the first reference signal by the first apparatus.

2. The method of claim 1, wherein the second reference signal comprises a beacon.

3. The method of claim 1, wherein the second reference signal comprises a probe response generated in response to a probe request received from a third apparatus.

4. The method of claim 3, wherein the second reference signal is transmitted in response to the probe request received from the third apparatus.

5. The method of claim 3, wherein the probe request is received omni-directionally.

6. The method of claim 1, wherein the defined time is within a contention access period or a dedicated service period.

7. The method of claim 1, wherein the second reference signal is transmitted less frequently than transmission of the first reference signal by the first apparatus.

8. The method of claim 1, wherein the transmission of the second reference signal comprises broadcasting the second reference signal in all directions in which one or more antennas associated with the second apparatus can transmit.

9. The method of claim 1, further comprising:
   receiving, by the second apparatus, discovery request from a third apparatus;
   processing the discovery request to determine eligibility of the third apparatus to access the first network; and
   transmitting a response to the third apparatus, wherein the response comprises the network shared information associated with the first network and specific information associated with the first apparatus.

10. The method of claim 1, wherein the first reference signal comprises time synchronization information associated with the first network, and further comprising:
    transmitting, by the second apparatus, a third reference signal that comprises information associated with a second network, while maintaining an association with the first network, wherein the information associated with the second network comprises time synchronization information and network shared information from the first reference signal.

11. The method of claim 1, wherein the network shared information comprises at least one of:
    a timestamp set to a common clock;
    an identifier for the first network;
    capability information for the first network;
    a reference signal transmission interval;
    a maximum number of apparatus allowed in the first network value; or
    a reference signal transmission restriction set which limits which apparatus may transmit a reference signal including the network shared information.

12. The method of claim 11, wherein the reference signal transmission restriction set is determined based on apparatus capability.

13. The method of claim 1, wherein the specific information comprises at least one of:
    transmission directions;
    receiving directions;
    a neighbor list;
    an extended neighbor list;

information about a contention access period;
information about a service period; or
information about a beam training period.

14. The method of claim 13, wherein the neighbor list comprises information associated with any other apparatuses that have established a connection with the second apparatus.

15. The method of claim 13, wherein the neighbor list comprises one or more neighbor lists from other apparatuses from which the second apparatus has received at least one of the first or second reference signal.

16. The method of claim 13, wherein the extended neighbor list comprises one or more neighbor lists from other apparatuses from which the second apparatus has received at least one of the first or second reference signal.

17. The method of claim 1, wherein the first reference signal is received using an IEEE 802.11 protocol.

18. The method of claim 1, wherein the defined time is selected using at least one of:
a round robin transmission protocol;
a random backoff transmission protocol; or
an assisted random backoff transmission protocol with assistance from information obtained from one or more apparatus associated with the first network.

19. The method of claim 1, wherein the first reference signal comprises at least one of:
time synchronization information associated with the first network, wherein the time synchronization is maintained using a maximum time drift threshold;
a beacon;
a probe response; or
a probe request.

20. A computer program product, comprising:
a computer-readable device comprising code executable to:
receive, by a second apparatus, a first reference signal from a first apparatus, wherein the first reference signal comprises network shared information associated with a first network and specific information associated with the first apparatus;
generate a second reference signal by updating the network shared information in the first reference signal to include specific information associated with second apparatus; and
transmit the second reference signal at a defined time, wherein the defined time is selected to minimize any interference associated with a subsequent transmission of the first reference signal by the first apparatus.

21. An apparatus for wireless communications, comprising:
means for receiving a first reference signal from a first apparatus, wherein the first reference signal comprises network shared information associated with a first network and specific information associated with the first apparatus;
means for generating a second reference signal by updating the network shared information in the first reference signal to include specific information associated with the apparatus; and
means for transmitting the second reference signal at a defined time, wherein the defined time is selected to minimize any interference associated with a subsequent transmission of the first reference signal by the first apparatus.

22. The apparatus of claim 21, wherein the second reference signal is a beacon transmission.

23. The apparatus of claim 21, wherein the second reference signal comprises a probe response generated in response to a probe request received from a third apparatus.

24. The apparatus of claim 23, wherein the second reference signal is transmitted in response to the probe request received from the third apparatus.

25. The apparatus of claim 23, wherein the probe request is received omni- directionally.

26. The apparatus of claim 21, wherein the defined time is within a contention access period or a dedicated service period.

27. The apparatus of claim 21, wherein the means for transmitting further comprise means for transmitting the second reference signal less frequently than transmission of the first reference signal by the first apparatus.

28. The apparatus of claim 21, wherein the means for transmitting further comprise means for broadcasting the second reference signal in all directions in which one or more antennas associated with the apparatus can transmit.

29. The apparatus of claim 21, wherein the means for receiving further comprises means for receiving discovery request from a third apparatus;
means for processing the discovery request to determine eligibility of the third apparatus to access the first network; and
wherein the means for transmitting further comprises means for transmitting a response to the third apparatus, wherein the response comprises the network shared information associated with the first network and specific information associated with the first apparatus.

30. The apparatus of claim 21, wherein the first reference signal comprises time synchronization information associated with the first network, and further comprising:
means for transmitting a third reference signal that comprises information associated with a second network, while maintaining an association with the first network, wherein the information associated with the second network comprises time synchronization information and network shared information from the first reference signal.

31. The apparatus of claim 21, wherein the network shared information comprises at least one of:
a timestamp set to a common clock;
an identifier for the first network;
capability information for the first network;
a reference signal transmission interval;
a maximum number of apparatus allowed in the first network value; or
a reference signal transmission restriction set which limits which apparatus may transmit a reference signal including the network shared information.

32. The apparatus of claim 31, wherein the reference signal transmission restriction set is based on apparatus capability.

33. The apparatus of claim 21, wherein the specific information comprises at least one of:
transmission directions;
receiving directions;
a neighbor list;
an extended neighbor list;
information about a contention access period;
information about a service period; or
information about a beam training period.

34. The apparatus of claim 33, wherein the neighbor list comprises information associated with any other apparatuses that have established a connection with the apparatus.

35. The apparatus of claim 33, wherein the neighbor list comprises one or more neighbor lists from other apparatuses from which the apparatus has received at least one of the first or second reference signal.

36. The apparatus of claim 33, wherein the extended neighbor list comprises one or more neighbor lists from other apparatuses from which the apparatus has received at least one of the first or second reference signal.

37. The apparatus of claim 21, wherein means for receiving further comprise means for receiving the first reference signal using an IEEE 802.11 protocol.

38. The apparatus of claim 21, wherein the defined time is selected using at least one of:
- a round robin transmission protocol;
- a random backoff transmission protocol; or
- an assisted random backoff transmission protocol with assistance from information obtained from one or more apparatus associated with the first network.

39. The apparatus of claim 21, wherein the first reference signal comprises at least one of:
- time synchronization information associated with the first network, wherein the time synchronization is maintained using a maximum time drift threshold;
- a beacon;
- a probe response; or
- a probe request.

40. A station, comprising:
an antenna;
a receiver configured to:
  receive a first reference signal from a first apparatus, wherein the first reference signal comprises network shared information associated with a first network and specific information associated with the first apparatus;
a processing system coupled to the antenna, configured to:
  generate a second reference signal by updating the network shared information in the first reference signal to include specific information associated with the station; and
a transmitter configured to:
  transmit the second reference signal at a defined time, wherein the defined time is selected to minimize any interference associated with a subsequent transmission of the first reference signal by the first apparatus.

41. An apparatus for communication, comprising:
a receiver configured to:
  receive a first reference signal from a first apparatus, wherein the first reference signal comprises network shared information associated with a first network and specific information associated with the first apparatus;
a processing system configured to:
  generate a second reference signal by updating the network shared information in the first reference signal to include specific information associated with the apparatus; and
a transmitter configured to:
  transmit the second reference signal at a defined time, wherein the defined time is selected to minimize any interference associated with the reception of the first reference signal.

42. The apparatus of claim 41, wherein the second reference signal is a beacon transmission.

43. The apparatus of claim 41, wherein the second reference signal comprises a probe response generated in response to a probe request received from a third apparatus.

44. The apparatus of claim 43, wherein the second reference signal is transmitted in response to the probe request received from the third apparatus.

45. The apparatus of claim 43, wherein receiver is further configured to receive the probe request is received omni-directionally.

46. The apparatus of claim 41, wherein the defined time is within a contention access period or a dedicated service period.

47. The apparatus of claim 41, wherein the transmitter is further configured to transmit the second reference signal less frequently than transmission of the first reference signal by the first apparatus.

48. The apparatus of claim 41, wherein the transmitter is further configured to broadcast the second reference signal in all directions in which one or more antennas associated with the apparatus can transmit.

49. The apparatus of claim 41, wherein the receiver is further configured to receive a discovery request from a third apparatus;
wherein the processing system is further configured to process the discovery request to determine eligibility of the third apparatus to access the first network; and
wherein the transmitter is further configured to transmit a response to the third apparatus, wherein the response comprises the network shared information associated with the first network and specific information associated with the first apparatus.

50. The apparatus of claim 41, wherein the first reference signal comprises time synchronization information associated with the first network, and wherein the transmitter is further configured to:
transmit a third reference signal that comprises information associated with a second network, while maintaining an association with the first network, wherein the information associated with the second network comprises time synchronization information and network shared information from the first reference signal.

51. The apparatus of claim 41, wherein the network shared information comprises at least one of:
a timestamp set to a common clock;
an identifier for the first network;
capability information for the first network;
a reference signal transmission interval;
a maximum number of apparatus allowed in the first network value; or
a reference signal transmission restriction set which limits which apparatus may transmit a reference signal including the network shared information.

52. The apparatus of claim 51, wherein the reference signal transmission restriction set is based on apparatus capability.

53. The apparatus of claim 41, wherein the specific information comprises at least one of:
transmission directions;
receiving directions;
a neighbor list;
an extended neighbor list;
information about a contention access period;
information about a service period; or
information about a beam training period.

54. The apparatus of claim 53, wherein the neighbor list comprises information associated with any other apparatuses that have established a connection with the apparatus.

55. The apparatus of claim 53, wherein the neighbor list comprises one or more neighbor lists from other apparatuses from which the apparatus has received at least one of the first or second reference signal.

56. The apparatus of claim 53, wherein the extended neighbor list comprises one or more neighbor lists from other apparatuses from which the apparatus has received at least one of the first or second reference signal.

57. The apparatus of claim 41, wherein the receiver is further configured to receive the first reference signal using an IEEE 802.11 protocol.

58. The apparatus of claim 41, wherein the defined time is selected using at least one of:

a round robin transmission protocol;

a random backoff transmission protocol; or an assisted random backoff transmission protocol with assistance from information obtained from one or more apparatus associated with the first network.

59. The apparatus of claim 41, wherein the first reference signal comprises at least one of:

time synchronization information associated with the first network, wherein the time synchronization is maintained using a maximum time drift threshold;

a beacon;

a probe response; or a probe request.

* * * * *